May 30, 1933.    C. B. DE VLIEG    1,912,033
MACHINE TOOL
Filed Jan. 10, 1927    8 Sheets-Sheet 7

Inventor:-
Charles B. DeVlieg,
By Churchill Parker Parlow
Attys.

Patented May 30, 1933

1,912,033

UNITED STATES PATENT OFFICE

CHARLES B. DE VLIEG, OF ROCKFORD, ILLINOIS, ASSIGNOR TO SUNDSTRAND MACHINE TOOL CO., OF ROCKFORD, ILLINOIS, A CORPORATION OF ILLINOIS

MACHINE TOOL

Application filed January 10, 1927. Serial No. 160,039.

This invention relates generally to machine tools and more particularly to a tool of the type generally designated as a milling machine.

It is the general object of the invention to provide such a machine of new and improved construction which will provide maximum efficiency to the edge of a cutting tool.

Another object is to provide a machine which, although of comparatively small overall physical dimensions so as to conserve floor space, nevertheless insures simplicity of operation and is capable of handling extraordinarily heavy cutting operations.

Another object is to provide such a machine of a construction adapted to obtain extreme rigidity during operation and thereby eliminate chatter between the cutter and the work.

Another object is to provide a milling machine in which the column, knee and saddle are formed as one integral and rigid casting and in which a spindle carrying head is clamped upon the column by means including a narrow guide to obtain alinement and wide bearing surfaces to insure rigidity.

Another object is to provide a milling machine of improved construction in which the alinement between the work and the cutter is dependent upon a member slidable upon the column of the machine and having opposed parallel surfaces engaging a narrow guide thereon.

Another object is to provide a milling machine in which the transmission gearing from the prime mover to the cutter spindle and to the work table is of simplified and improved construction so as to provide extremely efficient power transmissions to said parts.

Another object is to provide a milling machine in which the power driven parts are arranged in composite and self-contained units and are adapted to permit of ease in assembling.

Another object is to provide a milling machine in which a rotatable feed screw on the work table is held under tension so as to eliminate the possibility of buckling.

Another object is to provide a milling machine embodying means to drive a work table at feed or quick-traverse rates together with simplified manual and automatic control means therefor.

A further object is to provide a milling machine of simplified and improved construction embodying a convenient arrangement of control levers.

Further objects and advantages of my invention will become apparent as the description proceeds.

In the drawings:

Fig. 11 is a section taken approximately along the line 11—11 of Fig. 8.

Fig. 12$^a$ is a fragmental detail of a sleeve 177 shown in Fig. 12.

For purposes of disclosure I have illustrated in the drawings and will hereinafter describe in detail the preferred embodiment of the invention with the understanding that I do not intend to limit the invention to the particular construction and arrangement shown, it being contemplated that various changes may be made by those skilled in the art without departing from the spirit and scope of the appended claims.

Referring to the exemplary embodiment of the invention as disclosed in the drawings, a base or bed A of a milling machine has a forwardly projecting or knee portion B and is cast integrally with a vertically extending column portion C. A saddle or head D is slidably mounted upon the column C for vertical adjustment thereon, which head carries a horizontal rotatably mounted spindle E and a forwardly projecting overarm F. A work support or table G is mounted for transverse movement upon the bed B, the upper portion of the bed preferably having laterally extending portions 10 so as to provide a wide and extremely solid support for the table cast integrally with the bed A and column C.

Head and spindle mounting

Figure 3:
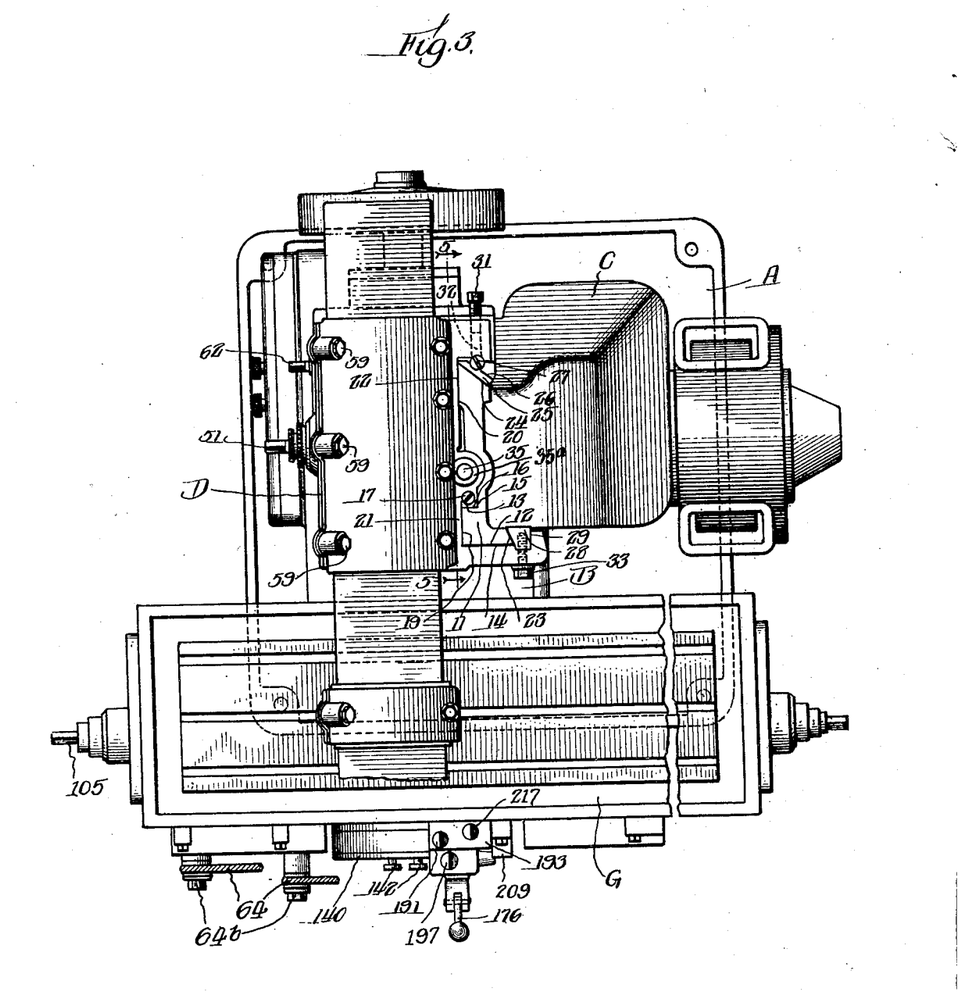
Fig. 3 is a plan view thereof with certain parts broken away.
Figure 5:
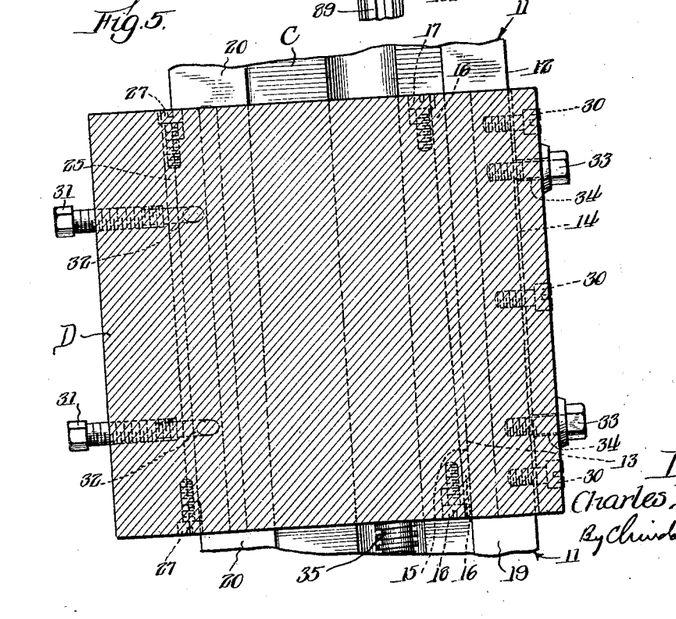
Fig. 5 is a vertical section along the line 5—5 of Fig. 3.

Means is provided to insure alinement between the spindle E and the table G, and to clamp the head D rigidly to the column C. In the form illustrated the column has a narrow guide 11 (Fig. 3) adjacent the forward edge thereof which guide has opposed ways 12 and 13 adapted to engage corresponding surfaces 14 and 15 on the head D. The surface 15 on the head is preferably formed on a taper gib 16 (Fig. 5) secured thereto and adjustable thereon by means of screws 17 and 18.

Additional bearing faces are provided on the head D and column C so as to insure rigidity between the spindle mounting and the work during operation of the machine. These surfaces (Figs. 3 and 5) include ways 19 and 20 which are formed on the face of the column parallel to the axis of the spindle and are in engagement with corresponding surfaces 21 and 22 on the head. Opposed to the ways 19 and 20 are ways 23 and 24 on the column against which gibs carried upon the head may be clamped. Thus a taper gib 25 is positioned between the way 24 and a surface 26 on the head and is adjustable to a sliding fit of the head on the column by means of screws 27. Similarly an angle gib 28 is positioned between the way 23 and an opposing surface 29 on the head and is adapted to be adjusted to a sliding fit of the head on the column by means of a plurality of filister-headed adjusting screws 30.

The taper gib 25 and the angle gib 28 are also provided with additional means to clamp the head rigidly to the column. For the taper gib this means comprises a plurality of clamping screws 31 threaded into the head D and arranged to engage individual plungers 32 positioned between the inner ends of the screws and the gib. Clamping screws 33 are entered slidably through apertures 34 in the head and into threaded engagement with the angle gib 28. Thus the screws 31 and 33 may be tightened to clamp the head rigidly upon the column, and when released, permit vertical adjustment of the head, the sliding fit of the head upon the column being then determined by the normal adjusting screws 27 and 30 of the gibs.

The head D may be adjusted on the column by means of a screw 35 which is journaled in the base A for rotational and against longitudinal movement, and which is in threaded engagement with a nut 35ᵃ (Fig. 3) secured in the head. The screw is operable by means of a shaft having a squared end 36 (Fig. 2) positioned beneath the front edge of the table G, which shaft may be connected to the screw 35 by suitable gearing (not shown).

The spindle E is journaled horizontally in the head D by means including a sleeve or quill 37 arranged to permit of axial adjustment of the spindle. As illustrated most clearly in Fig. 4 the spindle is mounted in the quill by means of tapered bearing sleeves 38 and 39 secured therein. The sleeve 38 is in engagement with a corresponding bearing surface on the spindle whereas the sleeve 39 engages a removable tapered bushing 40 which is keyed to the spindle. The bearings may be adjusted by means of a nut 41 and a shoulder 42 on the spindle.

Figure 4:
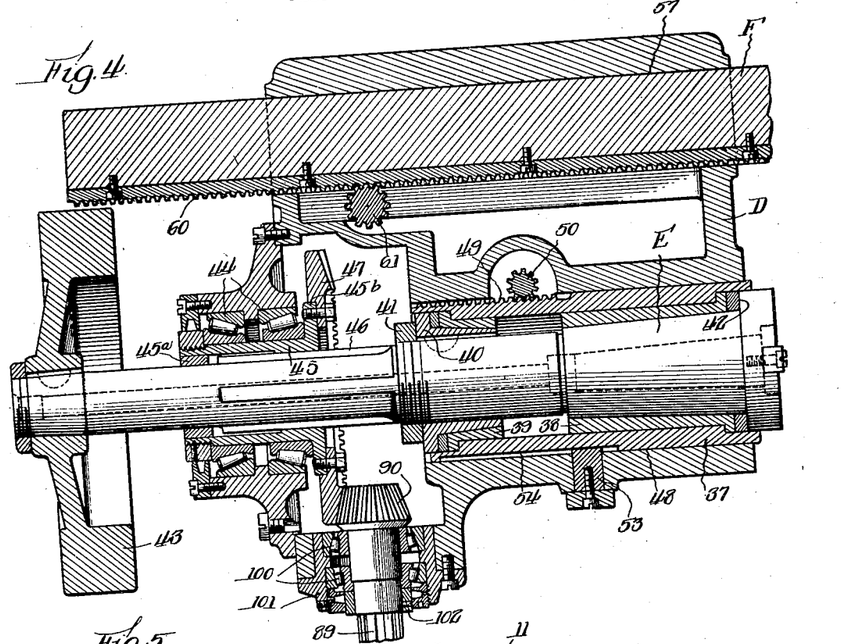
Fig. 4 is a vertical section along the line 4—4 of Fig. 2.

At its rear end the spindle E is preferably provided with a fly wheel 43, the rear portion of the spindle E being supported upon anti-friction bearings 44 and an intervening sleeve 45 and bushing 45ᵃ. The sleeve is splined to the spindle by means of a plurality of integral splines 46 and has a radial flange 45ᵇ to which a bevel driving gear 47 is secured.

Figure 1:
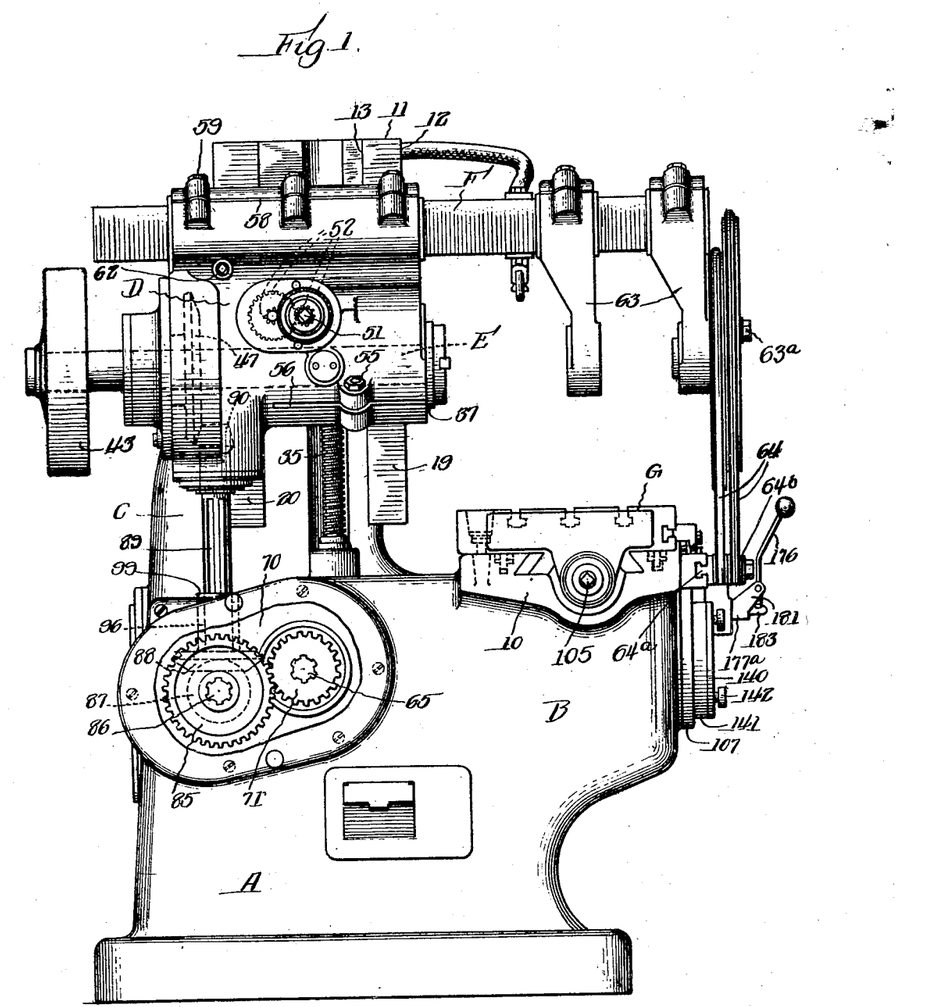
Figure 1 is a side elevation of the preferred form of the invention.

The quill 37 is slidable axially in a bore 48 in the head D so as to provide an axial adjustment of the spindle relative to the work table. To obtain such adjustment the quill has a rack 49 thereon which is engaged by a pinion 50. This pinion is operable by means of a shaft having a squared end 51 (Fig. 1) and suitable reduction gearing designated generally as 52 (Fig. 1) therebetween. A key 53 (Fig. 4) engaging an axial slot 54 in the quill is adapted to limit the movement of the quill and to prevent rotation thereof.

When the quill has been adjusted as desired it may be clamped in the adjusted position by means of a nut 55 (Fig. 1) which engages a threaded stud spanning a clamping slot 56 in the head D.

The head D is also arranged to support the overarm F. As illustrated in the drawings the overarm is rectangular in section and is adjustable longitudinally in a correspondingly shaped aperture 57 (Fig. 2) extending through the head and parallel with the axis of the spindle E. A side wall of the head is split as at 58 so that the arm may be clamped in its adjusted position by means of clamping bolts 59. To adjust the arm in the head suitable means may be provided such as a rack 60 (Fig. 4) on the arm which meshes with a pinion 61 formed on a shaft having a squared end 62 adapted to be engaged by a detachable handle. Customary supports 63 for the cutter arbor (not shown) may be provided together with braces 64 arranged to be secured between one of the supports 63 as by means of a bolt 63$^a$ and the forward edge of the bed A. As illustrated herein (Figs. 1 and 2) T slots 64$^a$ are formed upon the lateral extensions of the bed portion B so that by means of clamping devices 64$^b$ the lower ends of the braces may be secured both to one side of the axis of the spindle as shown in the drawings or one on each side.

The spindle E and the work support G are preferably driven from a single prime mover. The power transmission to the spindle will now be described.

Power transmission to the spindle

A main power shaft 65 (Figs. 6 and 7) is positioned transversely of the base A and is rotatably supported thereon by means including anti-friction bearings 66, 67 and 68. One end of this shaft projects from the right hand side of the machine to support a driving pulley 69 (having a housing 69$^a$), and the other end extends through a transmission casing 70 and beyond the opposite side of the frame A so as to receive a gear 71.

Figure 6:
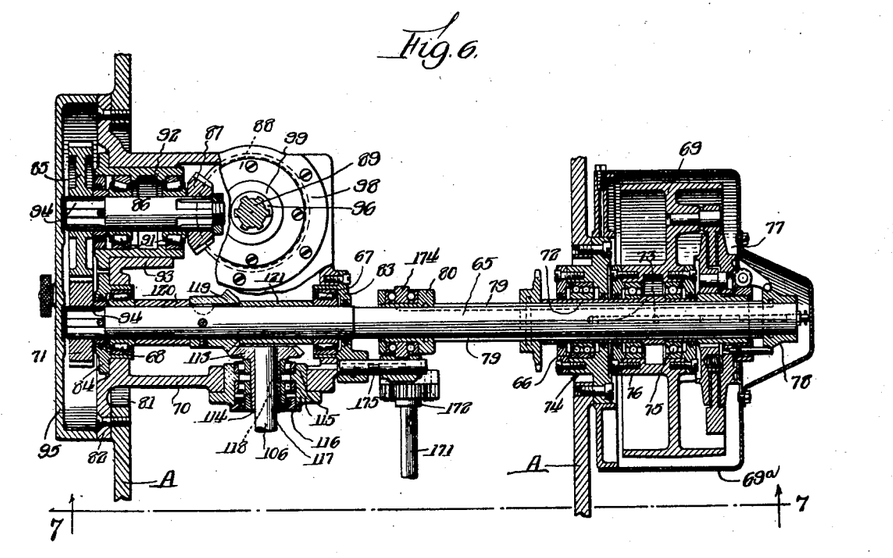
Fig. 6 is a fragmental plan section along the line 6—6 of Fig. 2.
Figure 7:
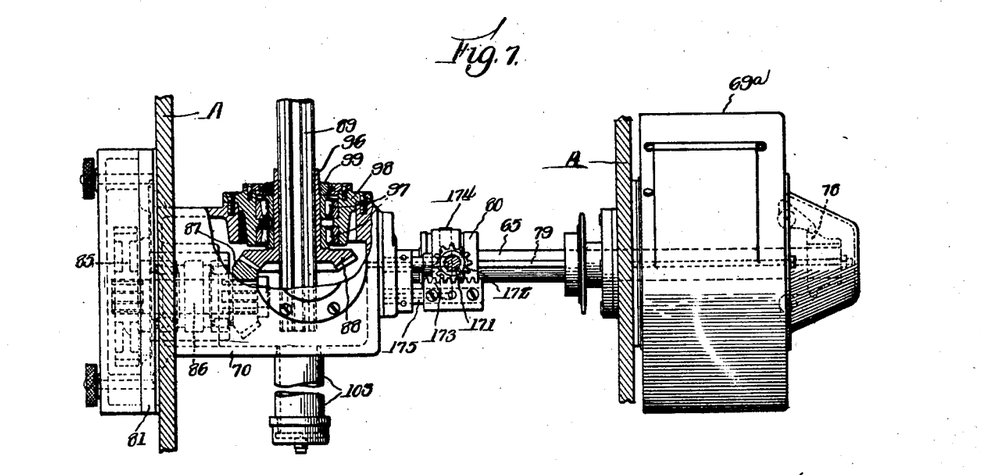
Fig. 7 is a fragmental elevation partly in section along the line 7—7 of Fig. 6.

As shown most clearly in Fig. 6, a sleeve 72 is carried upon the shaft 65 and is secured thereto by means of keys 79. The bearing 66 is mounted upon this sleeve 72 and is supported upon the base A by means of an annular housing 74 bolted thereto.

Bearings 75 are also mounted upon the sleeve 72, the outer races of which are secured in a hollow hub 76 of the drive pulley 69. The pulley is thereby normally freely rotatable with respect to the sleeve 72 and shaft 65. The pulley, however, may be connected to rotate the shaft 65 by means of a friction clutch device designated generally as 77. This device as illustrated herein may be operated by means including a member 78 slidable longitudinally of the shaft 65 and connected by means of a pair of keys 79 to an operating device 80 hereinafter more fully described.

The transmission casing 70 through which the other end of the shaft 65 extends is supported directly upon the base A. The casing preferably projects through an aperture 81 in the base and has a flange 82 thereon which is bolted to the adjacent wall of the base. As illustrated herein (Figs. 6 and 7) the casing is of a somewhat rectangular box shape having integral ends and sides. The bearings 67 and 68 for the shaft 65 have their outer races supported in flanged bushings 83 and 84 which enter apertures in the opposite ends of the casing and are bolted thereto.

The spindle E is arranged to be driven from the pick off gear 71 on the main power shaft 65 by means of intermediate gearing comprising a pick off gear 85, a stub shaft 86 and bevel gearing 87, 88 positioned in the casing 70, a vertical splined shaft 89, and a bevel pinion 90 (Fig. 4) thereon mounted in the head D, the pinion 90 meshing with the spindle gear 47. The stub shaft 86 is positioned parallel to the main shaft 65 and is journaled in a pair of bearings 91 mounted in a flanged bushing 92 which is secured in an apertured hub 93 on the casing. One end of the shaft 86 extends beyond the outer end wall of the casing similar to the main shaft 65, the two shafts each having a plurality of integral splines 94 arranged to engage ways in the bores of the pick off gears 71, 85. A detachable flanged cover 95 is adapted to house the gears and to retain them upon the shafts during operation of the machine, the cover being adapted to be removed to permit changes in the gearing when desired.

The bevel 88 is preferably formed integrally with a sleeve 96 which may be rotatably mounted in the top wall of the casing by means of a pair of bearings 97, a flanged bushing 98 and a collar 99. The bevel is thus supported in mesh with the bevel 87 on the stub shaft 86 and is splined to the shaft 89 so as to permit the withdrawal of the vertical splined shaft.

The upper end of the splined shaft 89 (Fig. 4) is rotatably mounted in bearings 100, which are supported in the head D by means of a flanged bushing 101. The shaft is constrained against axial movement in these bearings by means of the bevel 90, which is preferably formed integrally with the shaft, and a collar 102 thereon. Thus when the head D is raised or lowered the splined shaft 89 moves therewith, a housing 103 (Fig. 7) being provided for the lower end of the shaft when it extends downwardly beyond the casing 70.

Power transmission to the work support

Means is provided to drive the work support G at feed and quick-traverse speeds in opposite directions. As shown in the exemplary embodiment of the invention (Figs. 8, 11, 12, 13 and 16), this means comprises generally reversing and feed-traverse gearing housed in a transmission casing 104 which is mounted in the forward portion B of the bed A, a feed screw 105 rotatably journaled at its opposite ends in the table G and a secondary or table drive shaft 106 geared to the main shaft 65 and the mechanism in the casing for transmitting motion therebetween.

The transmission casing 104 is also preferably box-like in form and is arranged to be entered through an aperture 107 in the forward wall of the bed A and positioned with a peripheral flange 108 on the casing bolted against said wall.

The forward end of table drive shaft 106 enters the casing through a bore 109 in a detachable rear wall 110 thereof. The shaft is journaled in a sleeve 111 which is mounted in the bore 109, and has journaled thereon a bevel gear 112 of a reversing device which is hereinafter more fully described. The rear end of the shaft 106 enters through an aperture in the forward wall of the casing 70 to a position adjacent the main shaft 65 (Fig. 6).

The drive the shaft 106 from the main shaft 65 a bevel gear 113 having a sleeve 114 integral therewith is rotatably mounted in bearings 115 which are supported in a flanged bushing 116 secured to the forward wall of the casing 70. The sleeve 114 of the gear has an axial keyway 117 adapted to engage a key 118 secured to the shaft. The gear meshes with a companion bevel gear 119 which is keyed to the main shaft 65. This bevel is preferably mounted between sleeves 120 and 121 on the shaft 65 which sleeves engage the inner races of the bearings 68, 67 to restrain the gear from movement axially of the shaft.

The reversing device for the power transmission to the table G (Figs. 8, 13 and 16) comprises the bevel gear 112 on the table drive shaft 106, a corresponding bevel gear 120 secured to a short shaft 121 journaled in axial alinement with the shaft 106, an intermediate bevel gear 122 journaled for rotation at right angles to the gears 112 and 120 and meshing therewith, and a shiftable clutch member 123. The short shaft 121 is journaled in a sleeve bearing 124 mounted in the bore of a hub 125 formed integrally with the front wall of the casing 104. A portion of the shaft projects beyond the sleeve 124 to receive a pick-off gear 126 thereon and has splines 127 formed integrally therewith adapted to engage corresponding ways in the said gear. The intermediate bevel gear 122 is preferably formed integrally with a spur gear 128. These two gears are journaled by means of a bushing 129, on a bearing pin 130 suitably secured to one side wall of the casing 104. The clutch member 123 may be secured to the forward end of the drive shaft 106 by means of a plurality of splines 131 integral with the shaft and engaging corresponding ways therein. The clutch member is provided with axially extending teeth 132 on its opposite ends which are arranged to engage corresponding teeth 133 formed on the adjacent sides of the opposing bevel gears 112, 120.

The clutch member 123, as illustrated herein, has an annular groove 134 therein which is arranged to be engaged by an actuating member 135 hereinafter more fully described. When moved into engagement with the bevel gear 112 the clutch member locks that bevel to the shaft 106. This connection drives the spur gear 128 through the bevel gears 112, 122; and drives the short shaft 121 through all three bevel gears in a direction opposite to that of the shaft 106. When the clutch member is slid in the opposite direction and is engaged with the bevel gear 120, it constrains that gear (and thus the short shaft 121) to rotate with the shaft 106, the spur gear 128 being driven through the bevel gears 120, 122. The bevel gear 112 then rotates freely upon the shaft 106 in a direction opposite to that of the shaft. Thus the spur gear 128 and the short shaft 121 may be reversed simultaneously by means of the clutch member 123 and may be left idle by placing the clutch member in a neutral position intermediate the bevel gears 112, 120.

The table feed screw 105 is arranged to be driven either through the spur gear 128 at a quick-traverse rate suitable for shifting the table G most efficiently under no cutting load or through the short shaft 121 at a slow or feed rate suitable for cutting operations, by means including a feed-traverse clutch member 136 (Figs. 11, 12 and 16) which is operable to shift from one drive to the other. The means to impart a feed movement to the table from the shaft 121 will be first described.

As illustrated herein a second short shaft 137 is journaled in the front wall of the casing 104 parallel to and in a similar manner to the shaft 121. Thus this second shaft projects beyond the forward end of a bearing sleeve 138 to receive a second pick-off gear 139, the shaft having splines integral therewith to engage ways in the gear. The pick-off gears 126, 139 mesh, and when in operation are arranged to be prevented from sliding forwardly upon their respective shafts by means of a detachable cover 140 which may be secured against a peripheral flange 141 on the front side of the casing 104 to enclose the gears. By removing a pair of thumb nuts 142 which are preferably threaded upon screw-studs 143 anchored in the casing and extending through holes in the cover, the cover may be detached to permit removal and substitution of the gears. The means for driving the feed screw 105 to move the table G at a feed speed includes the pick-off gears 126, 139 (Figs. 8, 12 and 16) the shaft 137, bevel gears 144, 145, spur gears 146, 147, 148, 149, a non-rotatable shaft 150 extending transversely of the casing 104 and parallel to the feed screw 105, the clutch member 136 journaled thereon and having a spur gear 151 integral therewith which meshes continuously with a spur gear 152 splined on the feed screw. The bevel gear 144 may be formed integrally with the shaft 137. The gears 145, 146 and 147, 148 are preferably double-gears journaled upon bearing pins 153 and 154 mounted rigidly in the side wall of the casing 104. The non-rotatable shaft 150 passes through bores in the opposite side walls of the casing 104 and is secured therein by means of a nut 155 which is threaded on a projecting portion of the shaft and is adapted to clamp a shoulder 156 on the shaft against a collar 157 which is spaced from the wall by means of a bearing sleeve 158. The gear 149 which is herein disclosed as journaled upon this shaft by means of a roller bearing 159 is provided with axially extending clutch teeth 160 adapted to engage with corresponding teeth 161 on the clutch member 136. The clutch member is also shown journaled upon the shaft 150 by means of a roller bearing 162 and is adapted to be slid axially of the shaft into and out of engagement with the clutch teeth on the gear 149.

The quick-traverse drive means to the table from the spur gear 128 comprises a spur gear 163 which is journaled upon the sleeve 158 between the collar 157 and the adjacent side wall of the casing 104 and which has axially extending teeth 164 adapted to engage corresponding teeth 165 on the shiftable clutch member 136. Thus the clutch member 136 may be slid to engage either the feed gear teeth 160 or the quick-traverse gear teeth 164, or may be placed in a neutral non-engaging position intermediate the two gears.

The feed screw 105 as hereinbefore mentioned is journaled on the table G. As illustrated herein the screw is mounted in a pair of combined thrust and radial roller bearings 166, and between collars 168 screw threaded and pinned to plain end portions 169 of the feed screw so that the screw may be maintained under tension. This tension is preferably adjusted so as to be in excess of the load applied to the feed screw during the feeding and traversing movements of the table, to insure that the table is always being pulled in the direction desired by screw tension and thereby preventing any condition whereby the table would be pushed by the compression end of the screw. The ends of the screw are generally squared to receive a manual operating handle.

Intermediate its ends the feed screw 105 is arranged to pass through a substantially cylindrical housing comprising an upper portion 230 and a lower portion 231 (Figs. 8 and 11) which are suitably secured together and to the top wall of the casing 104 over an opening 232 therein to cover the same. The screw also passes through a non-rotatable sleeve nut 233 (Fig. 11) stationarily mounted in the upper portion of the bed portion B. The spur gear 152 may be formed integrally with sleeve extensions 152ª which are journaled in a bore 234 in the housing. A key 235 secured to the gear engages a corresponding keyway 236 in the feed screw to establish a driving connection therebetween which permits the table with the feed screw thereon to move axially of the gear 152. A sleeve 237 is preferably mounted in the left end of the housing and surrounding the feed screw.

The portion 230 of the housing may be provided with oil grooves 238, 239 arranged to feed oil carried up out of the casing 104 by the gears 151, 152, to the outside bearing surface of the sleeve. Oil may also be fed to the feed screw 105 from the supply in the casing 104 through a duct 240 in the sleeve 237 so as automatically to lubricate the screw during the operation of the machine.

*Manual controls*

The controls for the various parts of the machine are conveniently located along the front of the bed A and adjacent its upper edge so as to be stationarily mounted with respect to the base and within the reach of an operator when standing in his customary position.

The spindle E is controlled by means of the main clutch 77 on the drive shaft 65. This clutch is operable by means of a handle 170 secured to the forward end of a shaft 171 which is journaled horizontally in the base A. At its rear end (Fig. 6) the shaft 171 carries a pinion 172 which is arranged to mesh with a rack 173. This rack is carried on a ring 174 which is journaled on the shiftable member 80 and is constrained against rotation by a pin 175 extending from the rear wall of the casing 70. Thus when the handle 170 is moved toward a horizontal position the clutch 77 is operated to disengage the shaft 65 from the pulley 69, and when moved toward a vertical position the clutch engages the shaft with the pulley.

The movements of the work table G are preferably controlled manually by means of a single control lever 176 which is connected to the reversing clutch member 123 and to the feed-traverse clutch member 136 by means now to be described.

Figure 8:
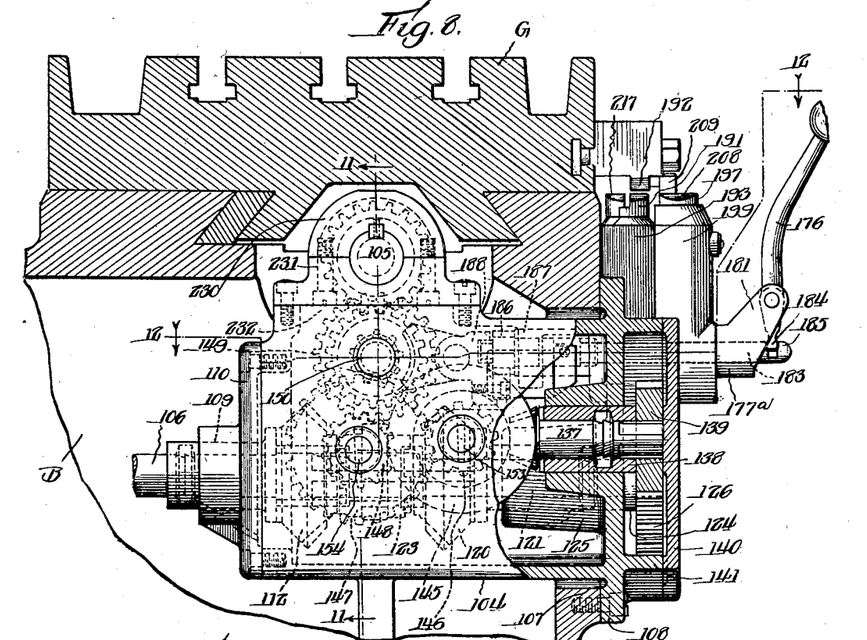
Fig. 8 is a fragmental elevation partly in section along the line 8—8 of Fig. 2.
Figure 9:
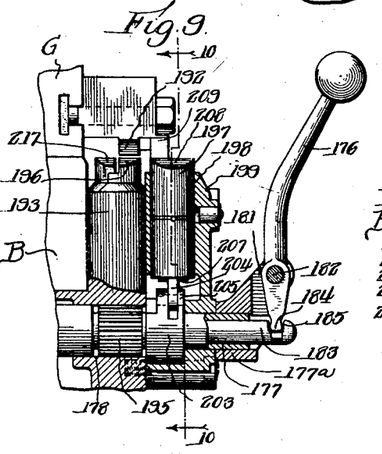
Fig. 9 is a fragmental elevation partly in section along the line 9—9 of Fig. 10.
Figure 10:
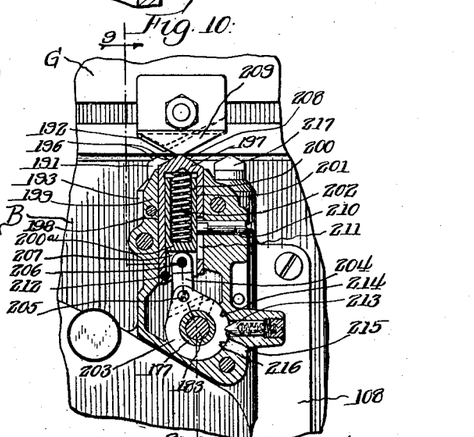
Fig. 10 is a fragmental elevation partly in section along the line 10—10 of Fig. 9 showing the position of the parts when the feed-traverse clutch is in neutral.
Figure 12:
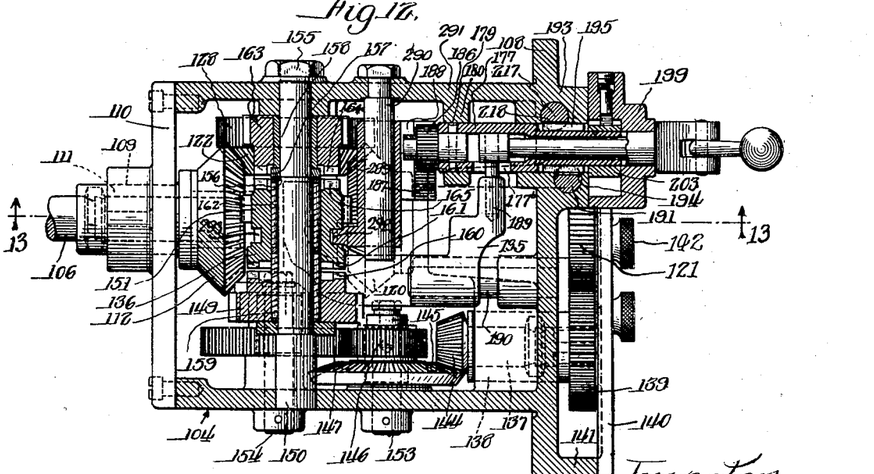
Fig. 12 is a plan section along the line 12—12 of Fig. 8.
Figure 13:
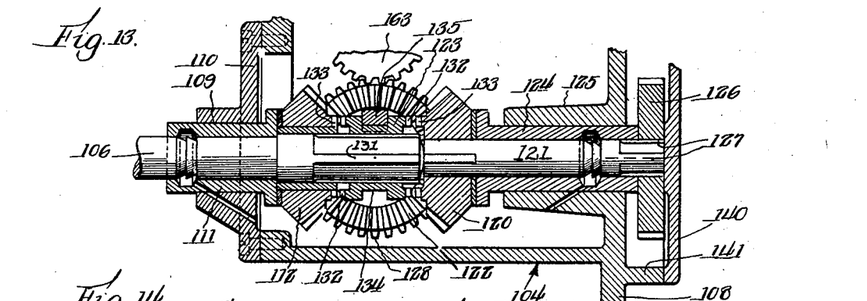
Fig. 13 is a section along the line 13—13 of Fig. 12.
Figure 14:
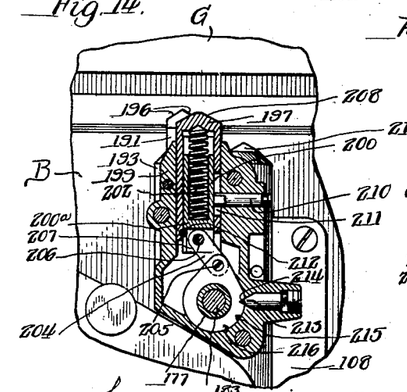
Fig. 14 is a view similar to Fig. 10 except that the feed-traverse clutch is engaged to feed the table.
Figure 15:
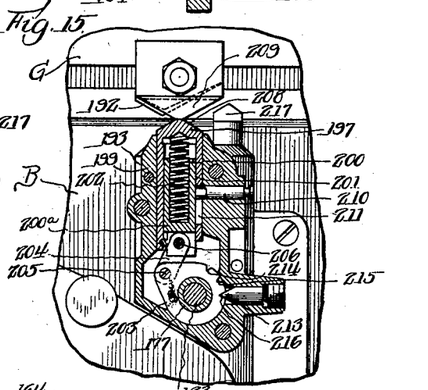
Fig. 15 is a view similar to Fig. 14 except that the feed-traverse clutch is engaged to traverse the table.
Figure 16:
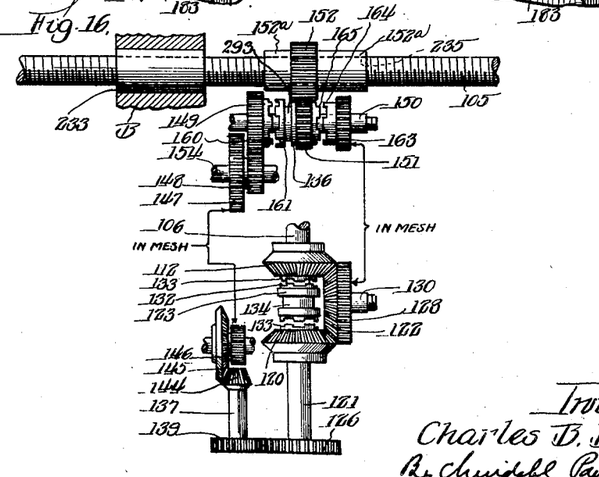
Fig. 16 is a diagrammatic view of the gearing in the work table transmission casing.

As shown most clearly in Figs. 8, 9 and 12, this control handle is positioned immediately forward of the casing 104 and is supported to pivot upon two horizontal axes at right angles to each other. The handle is connected to the clutch members 123 and 136 so that when pivoted upon one axis it actuates the reversing clutch and when pivoted upon the other axis it actuates the feed-traverse clutch.

Referring particularly to Figs. 8, 9 and 12, the lever 176 is carried upon a sleeve 177 which is rotatably mounted in bores 178 and 179 in the front casing wall and in a flange 180 projecting from a side wall of the casing. A member 177ª is fixed upon the forward end of the sleeve 177 and has a pair of spaced lugs 181 projecting upwardly therefrom, the lever being pivotally mounted intermediate its ends on a pin 182 positioned therebetween so as to be capable, when actuated, of oscillating the sleeve about its axis. The lever 176 is also arranged to actuate a plunger 183 which is slidable axially in the bore of the sleeve and for this purpose the lower end 184 of the lever is engaged in a notch 185 in the plunger. Thus by pivoting the lever about the axis of the sleeve the plunger 183 is not moved, and by pivoting the lever about the pivot pin 182 the plunger 183 may be actuated independently of the sleeve.

The oscillatory movement of the sleeve 177 is utilized to operate the feed-traverse clutch member 136 and the reciprocatory movement of the plunger 183 is arranged to operate the reversing clutch member 123.

To provide an operative connection between the sleeve 177 and clutch member 136 a spur pinion 186 secured to the sleeve is arranged to engage a rack 187 fixed on a reciprocable clutch actuating member 188. This clutch actuating member 188 has a sleeve-like portion 289 mounted slidably upon a pin 290 which may be bolted to the side wall 291 of the transmission casing 104 and is provided with a projecting finger 292 which extends into a peripheral slot 293 in the clutch member 136. Thus upon rotating the sleeve 177 by means of the control lever 176 the pinion 186 actuates the clutch actuating member 188 through the rack 187.

Figures 11, 12A:
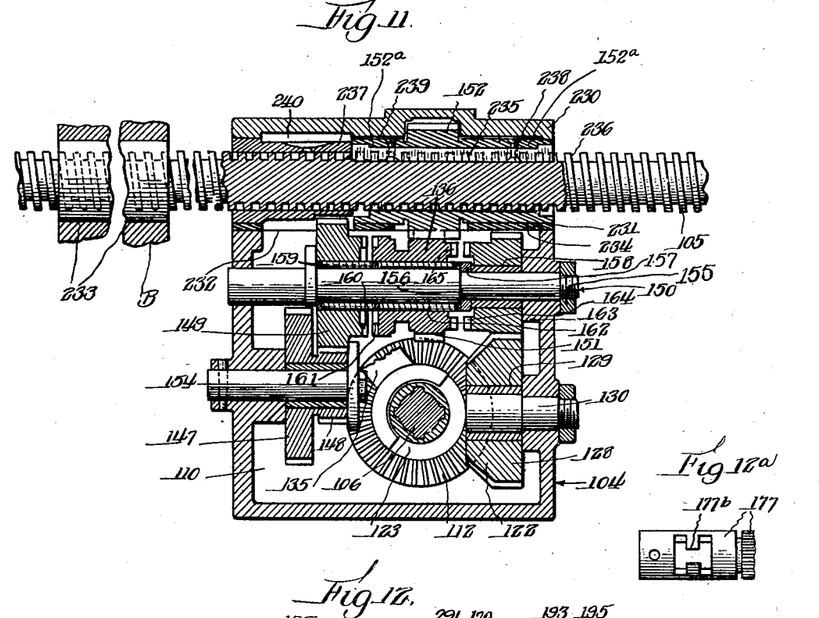

In the exemplary embodiment of the invention the plunger 183 is connected to the actuating member 135 for the reversing clutch 123 by means comprising a radially extending pin 189. This pin extends through an H slot 177ᵇ (Figs. 12 and 12ª) in the sleeve 177 and engages the reversing clutch actuating member 135 which is slidably mounted upon a pin 190 secured to the front wall of the casing 104 and parallel to the axes of the plunger 183 and clutch member 123. By means of the H slot the plunger 183 is constrained against axial movement when the feed-traverse clutch is engaged, thus insuring that no power is being transmitted to the work table when the reversing clutch is being actuated.

Figure 2:
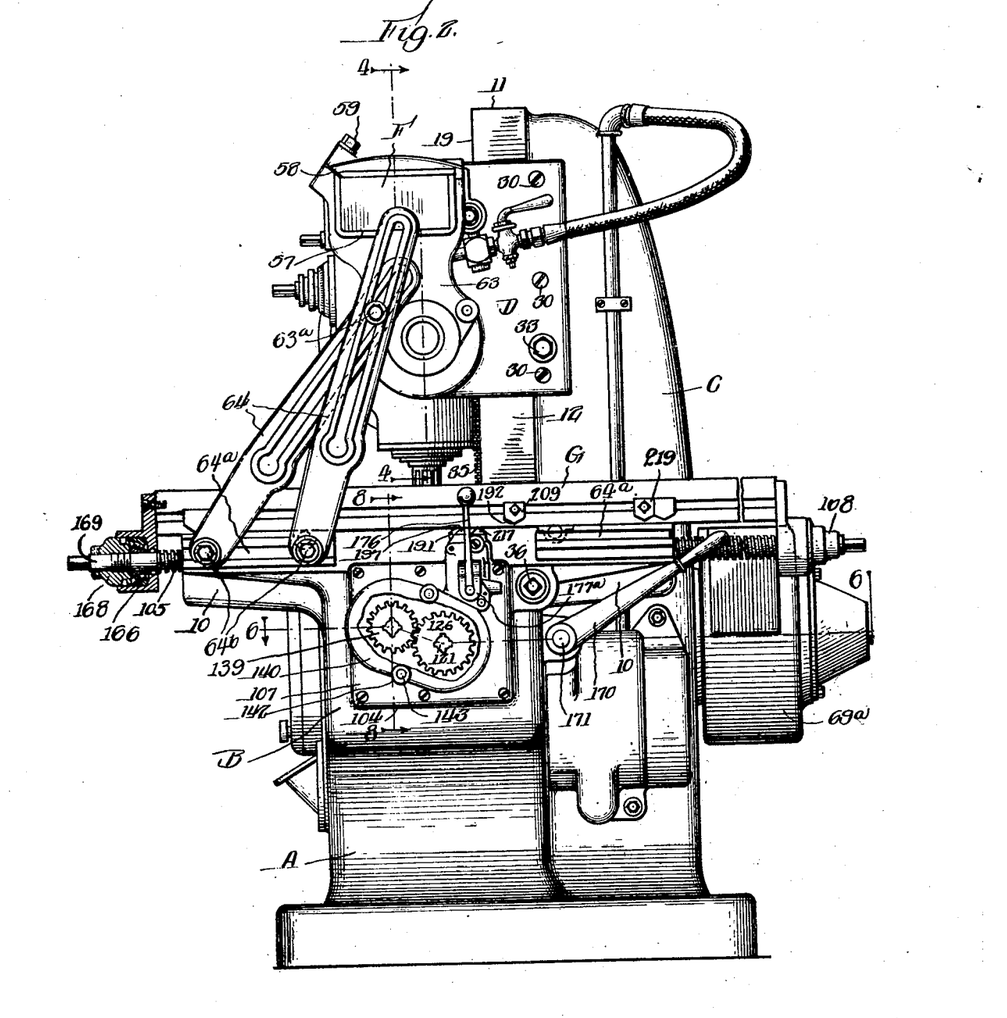
Fig. 2 is a front elevation thereof.

The gearing between the feed drive shaft 106 and the feed gear 149, and between the shaft 106 and the quick-traverse gear 163 is such that the gears 149 and 163 always rotate in opposite directions. This arrangement, when the reversing and feed-traverse clutches are positioned to feed the table forward (to the right as shown in Fig. 2), permits the operator to cause a quick-traverse movement of the table in the reverse direction (to the left in Fig. 2) merely by shifting the feed traverse clutch member 136.

*Automatic control for the work support*

Means is also provided to shift the clutch member from feed to traverse automatically at the end of a cutting stroke (Figs. 8 to 12, 14 and 15). This means in its preferred form comprises a plunger 191 having a rack and pinion connection with the sleeve 177 so that when actuated by a dog 192 mounted upon the table G the clutch member 136 is moved from its engagement with the feed gear 149 toward its neutral position. The plunger 191 is slidably mounted in a bore in a projecting portion 193 of the casing 104 and is provided with rack teeth 194 thereon which mesh with pinion teeth 195 on the sleeve 177. Cam faces 196 on the upper end of this plunger are adapted to be engaged by the dog 192 which is positioned in line therewith.

To complete the shift of the clutch member 136 through neutral and into engagement with the quick-traverse gear 163, a second dog actuated shift device is provided. This device comprises a hollow plunger 197 slidable vertically in a bore 198 in a block 199 secured to the extension 193 of the casing 104. A hollow piston-like member 200 is positioned in the bore 201 of the plunger 197, a compression spring 202 being inserted between the adjacent sides of the end walls of the plunger and piston so as normally to force the members apart. The piston is connected to an eccentric portion of a collar 203 secured to the sleeve 177, by means of a link 204 which is pivoted at its opposite ends to the said flange at 205 and at 206 to a bifurcated lug 207 formed integrally with the piston 200.

The upper end of the hollow plunger 197 is provided with cam surfaces 208 adapted to be engaged by a dog 209 which is mounted upon the forward edge of the table G in line with the plunger. A pin 210 may be entered through a hole in the wall of the casing extension 193 and into a longitudinal slot 211 in the plunger to limit the upward movement of the plunger and to prevent the plunger from rotating, and a pin 212 is preferably provided anchored in the lower portion of the plunger and arranged to limit the downward movement of the piston 200 therein by abutting the closed end 200ª thereof. A spring detent 213 is preferably provided to assist in retaining the clutch member 136 in either of its three positions by engaging in one of three V notches 214, 215, 216 in the collar 203 on the sleeve 177.

With the clutch member 136 engaged with the feed gear 149 and the table G moving toward the right (Figs. 2 and 14) the sleeve 177 is in a position with the detent 213 in the notch 214 and the plungers 191 and 197 raised. The hollow plunger 197 is pressed upwardly by the spring 202 into a position wherein the pin 210 engages the lower end of the slot 211, the piston 200 being held up by the link 204. When the dogs 192 and 209 engage the plungers 191 and 197, the dog 209 depresses the hollow plunger 197, thereby compressing the spring 202, and the dog 192 depresses the plunger 191, which in turn rotates the sleeve 177 toward a position wherein the detent 213 will engage the notch 215 and the clutch member will be in its neutral position. This rotation of the sleeve 177 by the plunger 191 raises the piston 200 and further compresses the spring 202. However, before the sleeve 177 has turned sufficiently to permit the detent 213 to enter the neutral notch 215, the pivot 205 has passed the dead center line between the axis of the sleeve 177 and the pivot 206 and the spring 202, pressing downwardly on the piston 200 causes the sleeve 177 to shift through neutral position and into the quick-traverse position wherein detent 213 enters in notch 216. The table G then moves at a traverse rate to the left.

A plunger 217 is provided as a companion to the plunger 191, this companion plunger being positioned staggered to the plunger 191 on the opposite side of the axis of the sleeve 177, and having rack teeth 218 engageable therewith. A dog 219 (Figs. 2 and 3) on the table G is positioned in line with cam surfaces on this plunger and may be arranged to engage the plunger at the end of the return or quick-traverse stroke of the table to shift the feed-traverse clutch to its neutral position wherein the detent 213 enters the V notch 215 and the table stops.

As illustrated in the drawings (Fig. 2) feed movement of the table G to the right is contemplated. For such movement the dogs 192 and 209 are positioned toward the right on the table so that when the clutch member 136 has been engaged with the feed gear 149 by manual manipulation of the lever 176 the dogs will limit the said feed movement and shift the clutch member 136 into engagement with the quick-traverse gear 163. This causes a quick-traverse return movement of the table until the dog 219 engages the plunger 217 and shifts the clutch member 136 into neutral. It will be obvious that additional dogs similar to the dogs 192 and 219 may be provided to actuate the trip device to stop the table at selected points in its travel.

It will be apparent from the foregoing that the construction contemplated by this invention is particularly well adapted to handle extraordinarily heavy cutting operations and at the same time insure rigidity between the various parts, simplicity of control and an economical operation. In addition the parts, as hereinbefore indicated are arranged and combined so as to permit of a unitary form of construction to permit of convenient manufacture and assembly.

With the column of the machine cast integrally with the bed and an unusually long and solid bearing surface for the table provided by the lateral extensions which are also cast integrally with the bed, any tendency of the work support to tip across the bed is effectively prevented. This, together with the narrow guide on the column for the head D insures alinement of the spindle with the table and the large bearing surfaces on the head and column together with the fact that the clamping action of the gibs is not dependent directly upon the strength of the clamping screws, provides a machine remarkably rigid during operation. It is believed readily apparent that with the ways of the column in direct engagement with opposing surfaces on the head or in engagement with gibs backed by opposing surfaces upon the head the tendency of the head to be pried from the column during heavy cutting is effectively overcome. The construction disclosed provides for the utmost rigidity between the parts during operation and with a fly wheel mounted directly upon the spindle the smooth drive provided by the simple and direct drive to the spindle is maintained under varying loads, and chatter and vibration are eliminated.

The entire power transmission is divided into four composite units and permits of ease and convenience in manufacture and assembly. The driving pulley and main clutch are journaled on a sleeve mounted upon the base A and may be detached from the frame and slid off the main drive shaft. Similarly the head D may be removed vertically from the column C, the vertical drive shaft being thereby withdrawn from the casing 70.

By removing the table G and the feed screw 105, the feed-traverse gearing and controls, mounted on the transmission casing 104, may be detached from the bed and withdrawn with the shaft 106 forwardly of the machine, and with these three units removed, the transmission casing for the spindle may be detached, and, together with the main drive shaft 65 may be withdrawn outwardly from the base.

The feed-traverse transmission is compact and of a highly efficient construction and with a single manual control lever mounted upon the bed, the control of the machine is extremely convenient and simple.

I claim as my invention:

1. In a milling machine, the combination of a base, a table slidable thereon, means to move said table on said base including a feed screw mounted upon the table and a nut secured to the base, and means to mount said screw rotatably upon said table including an anti-friction clutch bearing intermediate each end of the screw and the table and means adjustable to place a constant working tension on the screw axially through said bearings, which tension is in excess of the load applied to the screw during the feeding and traversing movements of the table.

2. In a milling machine, in combination with a movably mounted work support, transmission gearing for said work support including a reversing clutch, and a feed-traverse clutch, said clutches having shiftable members, a sleeve rotatably mounted and connected to said feed-traverse clutch member, a plunger slidable axially of said sleeve, means connecting said plunger to the reversing clutch member, said means including a pin projecting radially through said sleeve and operable in an H slot, and an operating lever pivotally mounted on said sleeve and arranged to actuate said plunger.

3. In a machine of the character described, the combination of a support, a work table slidable transversely on said support, and a power transmission to said table operable to move said table in either of two directions and at feed and traverse speeds, said transmission including a power driven shaft, a reversing device comprising a bevelled gear rotatable upon said shaft, a clutch member splined to said shaft, a second shaft adjacent to and in axial alinement with said power driven shaft, an opposing bevel gear secured to said second shaft to rotate therewith and an intermediate bevel gear in mesh with said opposed bevel gears, a feed gear driven by said second mentioned shaft and a traverse gear driven by said intermediate bevel gear.

4. In a milling machine having a hollow base and a table slidable on said base, said base having an aperture formed in the top wall thereof and an aperture in the side wall thereof adjacent the top of said base, said table having a feed screw rotatably mounted thereunder and engaging a nut on said base, the combination of a feed box adapted to extend into said base through said side wall aperture and to be secured in such a position, said feed box having an aperture formed in the top side thereof, a first gear mounted in said box and adapted to be engaged through said aperture, a driving shaft extending through the inner wall of said feed box, feed-change gearing connecting said shaft with said gear including a pair of pick-off gears mounted on and accessible from the outside of said box, a gear splined on said feed screw adapted to engage said first gear through the aperture in said feed box, and a cover for said feed box arranged to provide a bearing for said splined gear and for said feed screw adjacent said splined gear, said cover being detachably secured to said feed box to permit horizontal withdrawal of said feed box from said base.

5. In a machine of the character described, the combination of a base, a work support slidable transversely upon said base, a transmission casing having a top opening therein mounted in said base beneath said table and withdrawable therefrom, said casing having a driven gear engageable through said opening, a power driven shaft entering said casing through a side wall thereof, a feed screw journaled on the under side of said table, a nut engaging said feed screw mounted in said base, a cover for the top opening in said casing having an upwardly extending portion through which said feed screw extends, a gear splined to said feed screw and journaled in said cover and meshing with said driven gear through said opening, and means in said casing between said power driven shaft and said gear operable to effect a movement of said table upon said bed in opposite directions, said cover being detachable from said casing to permit said casing to be withdrawn from said base.

6. In a machine of the character described, the combination of a base, a work support slidable transversely upon said base, a transmission casing mounted in said base beneath said table and withdrawable therefrom, said casing having a top opening formed therein and a driven gear engageable through said opening, a power driven shaft entering said casing through a side wall thereof, a feed screw journaled on the under side of said table, a nut engaging said feed screw mounted in said base, a gear splined to said feed screw, a cover for said casing formed in two portions detachably secured about said feed screw and splined gear to form a bearing for said splined gear, said splined gear being engageable through the lower side of said cover, and means in said casing operable to effect driving connections between said power driven shaft and said driven gear to effect a movement of said table at a feed or traverse rate in either of two directions, said cover being detachable from said casing to permit said casing to be withdrawn from said base.

7. In a machine tool having a movably mounted work support, transmission gearing for said work support including a reversing clutch, and a feed-traverse clutch, said clutches having shiftable members, a sleeve rotatably mounted and connected to one of said clutch members, a member slidable axially of said sleeve, means connecting said member to the other clutch member, a pair of laterally spaced upwardly extending lugs on the outer end of said sleeve, a pin extending between said lugs, and an operating lever pivotally mounted intermediate its ends on said pin and connected at its lower end to said slidable member, said lever being operable when swung about the axis of said sleeve to actuate the clutch member connected to the sleeve and when swung about said pivot to actuate the clutch member connected to said slidable member.

8. In a milling machine, the combination of a movably mounted work support, transmission gearing for feeding and traversing said work support and including two clutches, said clutches having shiftable members, a sleeve rotatably mounted and connected to one of said clutch members, a member slidable axially of said sleeve, means connecting said member to the other clutch member, supporting means on the outer end of said sleeve, and an operating lever pivotally mounted intermediate its ends on a pin supported by said means and connected at its lower end to said slidable member, said lever being operable when swung about the axis of said sleeve to actuate only the clutch member connected to the sleeve and when swung about said pivot to actuate only the clutch member connected to said slidable member.

9. In a milling machine having a base provided with an aperture in one wall thereof, a column uprising from the rear portion of said base, a table slidable on the forward portion of the base transversely of the column, a head slidable vertically on said column and a spindle rotatably mounted in said head, the combination of actuating means for said spindle comprising a first transmission unit detachably mounted on one wall of said base and embodying a driving element extending into said base, a second transmission unit comprising a gear casing detachably mounted on the apertured wall of said base and extending into the base through said aperture in said wall, a beveled gear rotatably mounted on a bearing in the upper wall of said casing and having a splined bore, means intermediate said driving element and gear for driving the gear including a pair of pickoff gears accessible from the outside of the base, a beveled gear on said spindle, a vertical shaft rotatably mounted at one end in said head and carrying a beveled pinion meshing with said beveled gear on the spindle, said shaft being movable vertically with the head and having a spline on its lower portion arranged to couple with the spline on the beveled gear in said casing when the head is in operable position on the column, said casing having an aperture in the bottom wall thereof permitting said vertical shaft to extend therethrough when the head is lowered.

10. In a milling machine having a hollow base provided with side wall apertures, a column extending upwardly from the rear portion of said base, a table slidable transversely on said base in front of said column, a head slidable vertically on said column and a spindle rotatably mounted in said head, the combination of actuating means for said spindle and table comprising a first transmission unit detachably mounted on one wall of said base and embodying a driving element extending into the base through an aperture in said wall, a second transmission unit comprising a gear casing extending into said base through an aperture in another wall and having a flange thereon for bolting the casing to said wall, a beveled gear rotatably mounted on the top wall of said casing and having a splined bore, a drive shaft for the spindle rotatably mounted at its upper end in said head so as to be movable vertically therewith and having a splined lower portion slidably engaging the splined bore of said beveled gear, driving means intermediate said driving element and beveled gear including a pair of pickoff gears, a second beveled gear rotatably mounted on the front wall of said casing and a third transmission unit comprising a feed box mounted within said bed immediately beneath said table and extending through an aperture in the front wall of the base, a shaft rotatably mounted in said feed box and extending rearwardly therefrom, means for preventing longitudinal movement of said shaft relatively to said feed box, interengaging means on the rear end of said shaft and said second beveled gear operable when the feed box is in its operative position to couple said feed shaft and gear, means carried on said feed box for actuating said table at feed and traverse rates in opposite directions and including a pair of pick-off gears accessible through a detachable cover on the front of said box.

11. In a milling machine having a hollow base provided with side wall apertures, a column extending upwardly from the rear portion of said base, a table slidable transversely on said base in front of said column, a head slidable vertically on and withdrawable off the upper end of said column and a spindle rotatably mounted in said head, the combination of actuating means for said spindle and table comprising a first transmission unit detachably mounted on one wall of said base and embodying a driving element extending into the base through an aperture in said wall, a second transmission unit comprising a gear casing extending into said base through an aperture in another wall and having means thereon for bolting the casing to said wall, a gear having a slotted bore, means rotatably supporting said gear on the top wall of said casing, a drive shaft for the spindle rotatably mounted at its upper end in said head so as to be movable vertically and withdrawable therewith and having a splined lower portion slidably engaging the slotted bore of said gear, driving means intermediate said driving element and gear including a pair of pickoff gears, a second gear having a slotted bore, means rotatably supporting said gear on the front wall of said casing and a third transmission unit comprising a feed box mounted within said bed immediately beneath said table and extending through an aperture in the front wall of the base, a shaft rotatably mounted in said feed box and extending rearwardly therefrom, interengaging means on the rear end of said shaft and said second gear operable when the feed box is in its operative position to couple said shaft and gear, means carried on said feed box for actuating said table at feed and traverse rates in opposite directions and including a pair of pick-off gears accessible through a detachable cover on the front of said box.

12. In a milling machine having a base, a column extending upwardly from the rear portion of said base, a table slidable transversely on said base in front of said column, a head slidable vertically on and withdrawable off the upper end of said column and a spindle rotatably mounted in said head, the combination of actuating means for said spindle and table comprising a first transmission unit detachably mounted on one wall of said base and embodying a driving element extending into the base, a second transmission unit comprising a gear casing extending into said base, a gear having a slotted bore, means rotatably supporting said gear on the top wall of said casing, a drive shaft for the spindle rotatably mounted at its upper end in said head so as to be movable vertically and withdrawable therewith and having a splined lower portion slidably engaging the slotted bore of said gear, a second gear having a slotted bore, means rotatably supporting said second gear in the forward portion of said casing, means forming a driving connection between said driving element and gears, a third transmission unit comprising a feed box mounted in the front portion of said base immediately beneath said table, a shaft rotatably mounted in said feed box and extending rearwardly therefrom, a spline on the rear end of said shaft operable when the feed box is in its operative position to couple said shaft and second gear, and means carried in said feed box and driven by said last mentioned shaft for actuating said table.

13. In a milling machine, the combination of a base, a work support slidable transversely upon said base, a transmission casing detachably mounted in said base beneath the said work support and withdrawable therefrom, said casing having a top opening formed therein, a driven gear rotatably mounted in said casing and engageable through said opening, a power driven shaft entering said casing through a side wall thereof, a first element comprising a feed screw mounted on the under side of said table for movement therewith, a second element comprising a nut cooperating with said feed screw, means for driving one of said elements arranged to be driven by said gear when the parts are assembled, a cover for said casing detachably secured about said feed screw and cooperating with said casing to prevent longitudinal movement of said driving means relatively to the casing, and means in said casing operable to effect driving connections between said power driven shaft and said driven gear to effect movement of said work support at feeding or traverse rates, said cover being detachable from said casing to permit said casing to be withdrawn from said base.

14. In a milling machine the combination of a base, a work table slidable transversely upon said base, a transmission casing detachably mounted in said base and insertable and withdrawable through an aperture in the forward wall of the base, said casing having an opening in the top thereof, a driven gear rotatably mounted in said casing and engageable through said opening, a power driven element entering said casing through a side wall thereof, a feed screw mounted beneath said table for movement therewith, a nut for said screw, a second gear for driving one of the parts of the screw and nut device, carried on the screw and arranged to be driven by said driven gear when the machine is assembled, a cover for said casing detachably secured thereto and surrounding a portion of said feed screw arranged to prevent longitudinal movement of said second gear relatively to the casing, and means in the casing forming a driving connection between said power driven element and said driven gear to effect movement of said work support, said cover being detachable from the casing to permit the casing to be withdrawn forwardly from said base.

In testimony whereof, I have hereunto affixed my signature.

CHARLES B. DE VLIEG.